(12) United States Patent
Arai et al.

(10) Patent No.: US 6,425,369 B2
(45) Date of Patent: Jul. 30, 2002

(54) CONTROL APPARATUS FOR INTERNAL COMBUSTION ENGINES

(75) Inventors: Masahiro Arai; Hatsuo Nagaishi, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 09/727,552

(22) Filed: Dec. 4, 2000

(30) Foreign Application Priority Data

Dec. 6, 1999 (JP) .......................................... 11-346135

(51) Int. Cl.[7] .......................... F02B 31/08; F02D 41/34
(52) U.S. Cl. ...................................... 123/348; 123/432
(58) Field of Search .................................. 123/432, 308, 123/345–348

(56) References Cited

U.S. PATENT DOCUMENTS 5,209,201 A * 5/1993 Horie et al. ................ 123/308

FOREIGN PATENT DOCUMENTS

JP 4-94433 3/1992

* cited by examiner

Primary Examiner—Gene Mancene
Assistant Examiner—Johnny H. Hoang
(74) Attorney, Agent, or Firm—Foley & Lardner

(57) ABSTRACT

In an internal combustion engine equipped with a pair of intake ports for each cylinder and capable of controlling a quantity of air entering the engine by controlling an intake valve open timing and an intake valve closure timing of each of a pair of intake valves located in the respective intake ports, a two-intake-valve operating mode is used in a high-load, high-speed operating range, whereas a one-intake-valve operating mode is used in predetermined low- and mid-load, low- and mid-speed operating ranges to create a great gas flow within the cylinder. A fuel injector is located in a first one of the intake ports to allow air flow through the first intake port over all operating ranges. An electronic engine control unit switches a compensating mode for an injection amount of fuel injected by the injector, based on changes in a quantity of wall fuel mass flow adhered onto the inner wall surface of the intake port during transient operating conditions, from one of a first compensating mode which is preprogrammed to be suitable for the one-intake-valve operating mode and a second compensating mode which is preprogrammed to be suitable for the two-intake-valve operating mode to the other.

31 Claims, 7 Drawing Sheets

CONTROL APPARATUS FOR INTERNAL COMBUSTION ENGINES

TECHNICAL FIELD

The present invention relates to the improvements of a control apparatus for an internal combustion engine with a pair of intake valves for each engine cylinder, and particularly to such a control apparatus for the cooperative control of intake-air control and fuel-injection control.

BACKGROUND ART

An internal combustion engine equipped with a pair of intake valves for each engine cylinder has been disclosed in Japanese Patent Provisional Publication No. 4-94433. In the engine disclosed in the Japanese Patent Provisional Publication No. 4-94433, in low engine speed ranges one of a pair of intake valves is held in a substantial inactive state and kept slightly opened to such a very small opening that the intake valve pauses at its substantially closed position, and additionally a fuel injector is provided to uniformly inject fuel spray toward both of two intake ports associated with the respective intake valves. Therefore, it is possible to create a great gas flow (increased turbulence) in the engine cylinder, by holding the one intake valve at the previously-described substantial inactive state.

SUMMARY OF THE INVENTION

However, in case of an internal combustion engine with a pair of intake valves for each cylinder, fuel would be injected into two intake ports associated with the respective intake valves, even during one-intake-valve operating mode during which one of the pair of intake valves is held at its substantial inactive state. In this case, there is a problem of undesired wall wetting at the intake port kept in the substantial inactive state. That is to say, a flow rate of fuel adhered to the inner wall surface of the intake port, which flow rate will be hereinafter referred to as a "wall fuel mass flow rate", tends to increase. There is a difficulty in forming uniform air/fuel mixture in the engine cylinder (or combustion chamber), and thus the transient air/fuel mixture ratio control accuracy tends to be lowered. As a consequence, exhaust emission control performance is also degraded. Additionally, there is a difference in intake-air velocity between a one-intake-valve operating mode during which one of a pair of intake valves is held at its substantial inactive state and the other intake valve is operated depending on engine operating conditions, and a two-intake-valve operating mode during which the pair of intake valves are both operated depending on the engine operating conditions. The difference in intake-air velocity results in a difference in the wall fuel mass flow rate. Thus, it is desirable to enhance the transient A/F control accuracy by compensating for a fuel injection amount, taking account of the difference in the wall fuel mass flow rate between the two different intake valve operating modes.

Accordingly, it is an object of the invention to provide a control apparatus for an internal combustion engine, which avoids the aforementioned disadvantages.

It is another object of the invention to provide a control apparatus for an internal combustion engine, which ensures increased gas flow within an engine cylinder in a low engine load range, and maintain a high air/fuel ratio control accuracy even during a load change transient.

In order to accomplish the aforementioned and other objects of the present invention, a control apparatus for an internal combustion engine comprises a control apparatus for an internal combustion engine comprises a pair of intake ports provided for each cylinder of the engine, a mode selector which selects, depending on engine operating conditions, either one of a first operating range in which air is drawn into the cylinder only through a first one of the intake ports and a second operating range in which air is drawn into the cylinder through both the intake ports, a fuel injector located in the first intake port through which air flows in all of the first and second operating ranges, and a compensator which switches a compensating mode for an injection amount of fuel injected by the injector, based on changes in a quantity of wall fuel mass flow adhered onto an inner wall surface of each of the intake ports during transient operating conditions, from one of a first compensating mode which is preprogrammed to be suitable for the first operating range and a second compensating mode which is preprogrammed to be suitable for the second operating range to the other.

According to another aspect of the invention, a control apparatus for an internal combustion engine comprises a pair of intake ports provided for each cylinder of the engine, a pair of intake valves located in the intake ports respectively, a mode selecting means for selecting, depending on engine operating conditions, either one of a one-intake-valve operating mode in which a first one of the intake valves is opened during intake stroke and the second intake valve is kept in a closed state so that air is drawn into the cylinder only through a first one of the intake ports and a two-intake-valve operating mode in which the intake valves are both opened during the intake stroke so that air is drawn into the cylinder through both the intake ports, a fuel injector located in the first intake port through which air flows in all of the one-intake-valve operating mode and the two-intake-valve operating mode, and a compensating means for switching a compensating mode for an injection amount of fuel injected by the injector, based on changes in a quantity of wall fuel mass flow adhered onto an inner wall surface of each of the intake ports during transient operating conditions, from one of a first compensating mode which is preprogrammed to be suitable for the one-intake-valve operating mode and a second compensating mode which is preprogrammed to be suitable for the two-intake-valve operating mode to the other.

According to a still further aspect of the invention, a method for controlling an internal combustion engine, wherein the engine includes a pair of intake ports provided for each cylinder of the engine, a pair of intake valves located in the intake ports respectively, and a fuel injector located in a first one of the intake ports to allow air to flow through the first intake port over all operating ranges of the engine, the method comprises selecting, depending on engine operating conditions, either one of a one-intake-valve operating mode in which a first one of the intake valves is opened during intake stroke and the second intake valve is kept in a closed state so that air is drawn into the cylinder only through the first intake port and a two-intake-valve operating mode in which the intake valves are both opened during the intake stroke so that air is drawn into the cylinder through both the intake ports, and switching a compensating mode for an injection amount of fuel injected by the injector, based on changes in a quantity of wall fuel mass flow adhered onto an inner wall surface of each of the intake ports during transient operating conditions, from one of a first compensating mode which is preprogrammed to be suitable for the one-intake-valve operating mode and a second compensating mode which is preprogrammed to be suitable for the two-intake-valve operating mode to the other.

DESCRIPTION OF THE PREFERRED EMBODIMENTS

Figure 1:
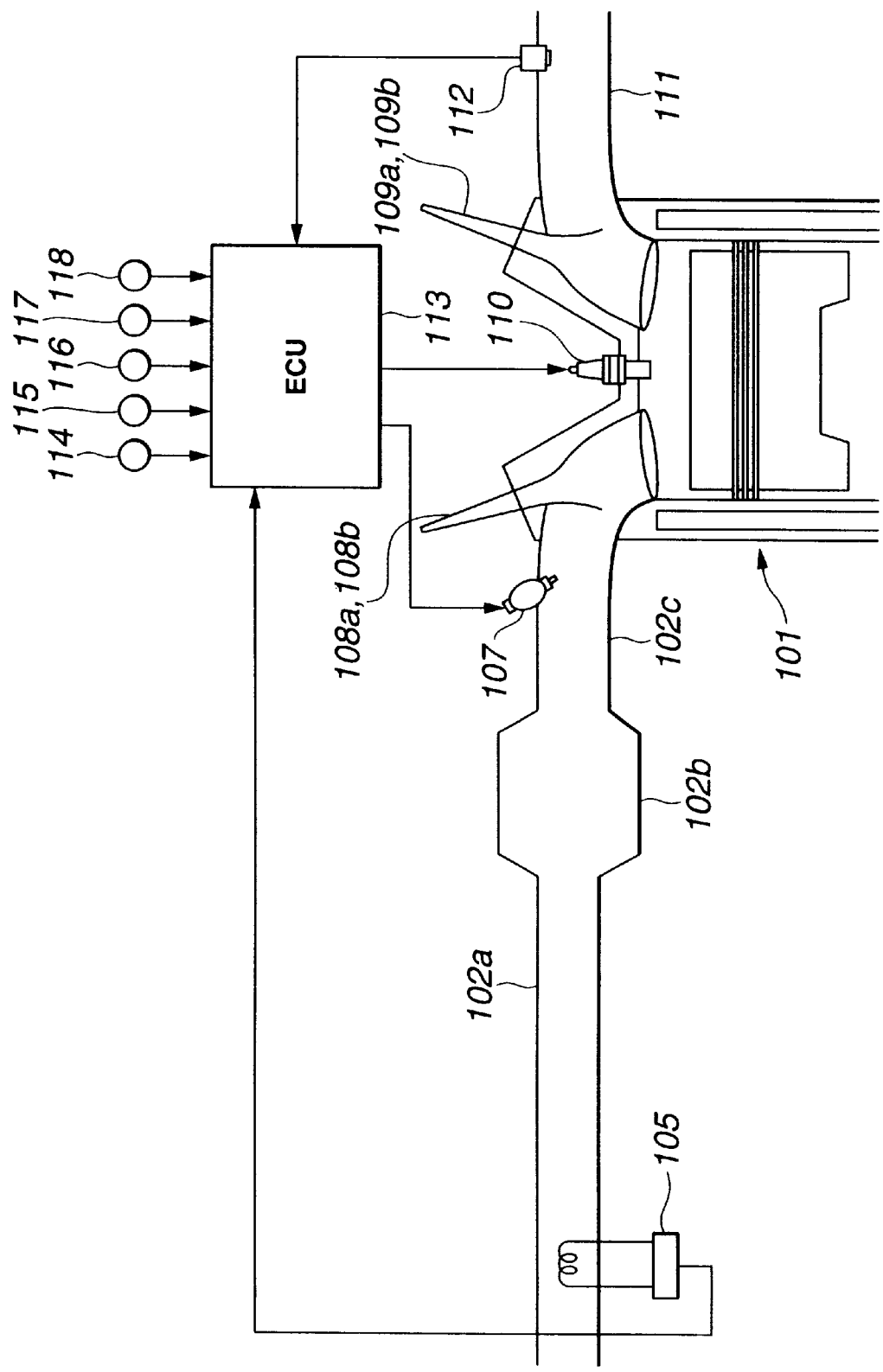
FIG. 1 is a system diagram of an internal combustion engine equipped a pair of intake ports for each engine cylinder, showing the general control system component layout.
Figure 2:
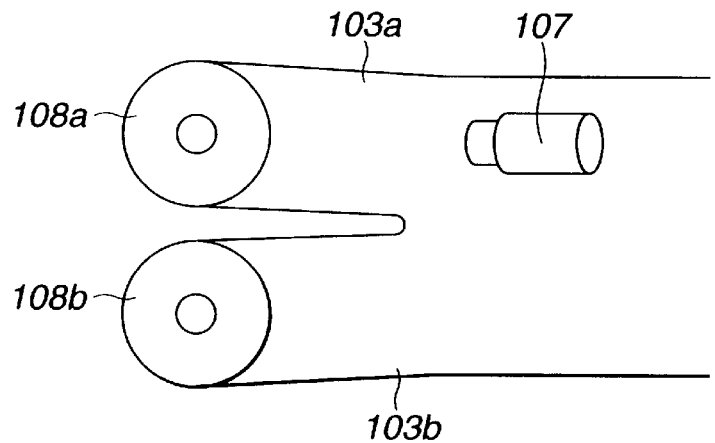
FIG. 2 is a schematic diagram showing the construction of the intake ports of the engine shown in FIG. 1.
Figure 3:
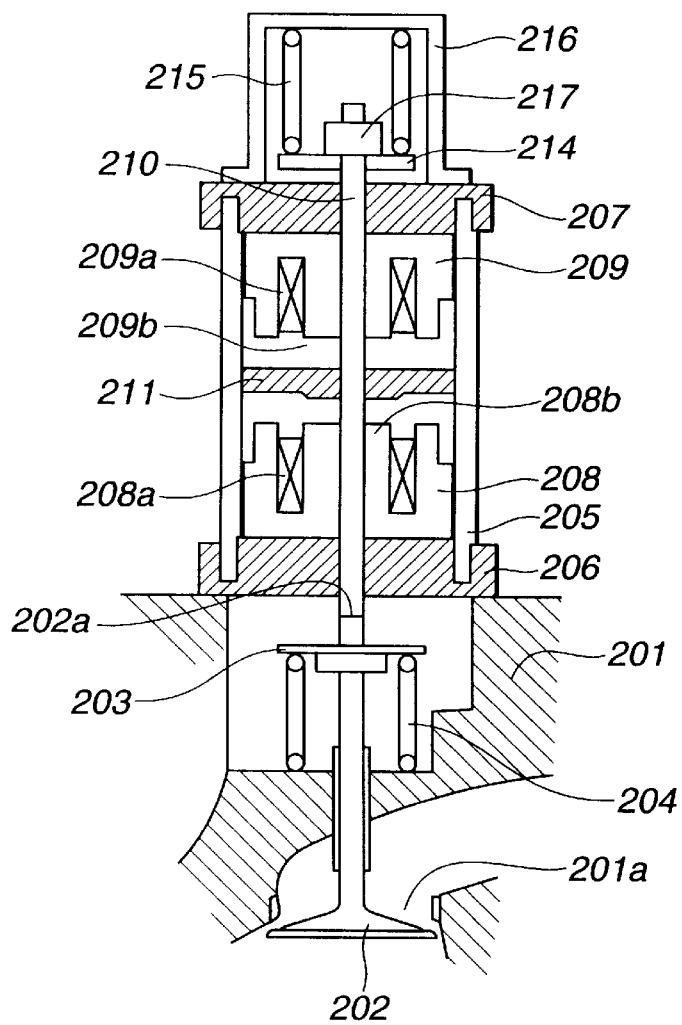
FIG. 3 is a longitudinal cross sectional view showing the general electromagnetic valve operating mechanism.

Referring now to the drawings, particularly to FIG. 1, the engine control apparatus of the invention is exemplified in a four-cycle, spark-ignition, four-valve internal combustion gasoline engine 101 for use in an automotive vehicle. As shown in FIG. 1, air is drawn through an induction system containing an intake-air duct 102a, an intake-air collector 102b and an intake manifold 102c into each engine cylinder. An airflow meter (AFM) 105 is located on intake-air duct 102a for detecting a quantity of air flowing through the airflow meter and drawn into the engine. A hot-wire mass air flow meter is commonly used as the air quantity sensor. As clearly shown in FIG. 2, a pair of intake ports 103a and 103b are connected to each engine cylinder. A pair of intake valves 108a and 108b are provided in the respective intake ports, for opening and closing them. As can be seen from FIG. 2, a fuel injection valve (simply, a fuel injector) 107 is located within intake port 103a associated with intake valve 108a in such a manner that fuel is injected through the injector towards a side of the fillet of intake valve 108a. In the shown embodiment, intake ports 103a and 103b are formed by dividing the intake-air duct into two branch pipes just before intake valves 108a and 108b. Alternatively, two intake ports 103a and 103b may be formed such that the respective intake ports extend individually from the downstream end of collector 102b towards the engine cylinder. A pair of exhaust valves 109a and 109b are provided in the engine for opening and closing respective exhaust ports. In the embodiment, each of intake valves 108a and 108b is comprised of an electromagnetically-powered intake valve. In the same manner, each of exhaust valves 109a and 109b is comprised of an electromagnetically-powered exhaust valve. Such an electromagnetically engine valve (108a, 108b, 109a, 109b) is driven by means of an electromagnetic actuator as shown in FIG. 3. The opening and closing (that is, valve timings) of the engine valves (108a, 108b, 109a, 109b) can be electronically variably controlled independently of each other in response to control signals generated from an electronic engine control unit (ECU) 113 to the respective electromagnetic actuators. A spark plug 110 is screwed into a tapped hole of the cylinder head for each combustion chamber of engine 101 to ignite the air fuel mixture in the combustion chamber. During exhaust stroke, burned gases are exhausted from the engine cylinder through the exhaust ports associated with exhaust valves 109a and 109b into exhaust manifold 111. Reference sign 112 denotes an air/fuel ratio sensor which is located in the junction of exhaust manifold 111 for monitoring or detecting an air/fuel mixture ratio (often abbreviated to "A/F" ratio or AFR) based on the percentage of oxygen contained within the engine exhaust gases at all times when the engine is running, so that the electronic engine control unit (ECU) can maintain the A/F ratio at as close to stoichiometric as possible, for complete combustion and minimum exhaust emissions. The electronic control unit usually comprises a microcomputer. Although it is not clearly shown in FIG. 1, ECU 113 includes a central processing unit (CPU) that performs necessary arithmetic calculations, processes informational data, compares signals from engine/vehicle sensors to predetermined or preprogrammed threshold values, and makes necessary decisions of acceptance, and memories (RAM, ROM), an input/output interface, and drivers (driver circuits) for amplification of output signals from the output interface. Actually, ECU 113 performs various data processing actions shown in FIGS. 8, 9 and 10 which will be fully described later. The input interface of ECU 113 receives input informational data from various engine/vehicle sensors, namely airflow meter 105, A/F ratio sensor 112, a crank-angle sensor 114, an engine temperature sensor 115, an intake-air temperature sensor 116, an accelerator opening sensor 117, and a vehicle speed sensor 118. Although it is not clearly shown in the drawing, the output interface of ECU 113 is configured to be electronically connected often through the driver circuits to electrical loads, such as fuel injector solenoids of fuel injectors 107, spark plugs 110, an intake-valve electromagnetic actuator for intake valves 108a and 108b and an exhaust-valve electromagnetic actuator for exhaust valves 109a and 109b, for generating control command signals to operate these electrical loads. Crank angle sensor 114 is provided for monitoring engine speed Ne as well as a relative position of the engine crankshaft. A coolant temperature sensor is usually used as engine temperature sensor 115. The coolant temperature sensor is mounted on the engine and usually screwed into one of top coolant passages to sense the actual operating temperature of the engine (engine coolant temperature or water temperature denoted by Tw). Intake-air temperature sensor 116 is generally located on intake-air duct 102a or intake manifold 102c for monitoring and reacting air temperature Ta within the intake-air duct (or the intake manifold). Intake-air temperature sensor 106 is useful to detect changes in air density of airflow through intake-air duct 102. Accelerator opening sensor 117 is located near the accelerator for monitoring an opening APO of the accelerator (the amount of depression of the accelerator pedal). Vehicle speed sensor 118 is usually located at either the transmission or transaxle (on front-wheel drive vehicles) for monitoring the output shaft speed to the road wheels. The output shaft speed is relayed as a pulsing voltage signal to the input interface of ECU 113 and converted into the vehicle speed data. The operating parameters detected by the previously-noted sensors are used to electronically control an ignition timing of an electronic ignition system containing spark plugs 110, a fuel injection amount as well as a fuel-injection timing of each of injectors 110 included in an electronic fuel-injection system, an intake valve closure timing (IVC) of each of intake valves (108a, 108b), an intake valve open timing (IVO) of each of the intake valves, an exhaust valve open timing (EVO) of each of exhaust valves (109a, 109b), and an exhaust valve closure timing (EVC) of each of the exhaust valves.

Referring now to FIG. 3, there is shown the detailed construction of each of electromagnetically-powered intake valves (108a, 108b) and electromagnetically-powered exhaust valves (109a, 109b). As can be seen from the cross section shown in FIG. 3, each engine valve units (108a, 108b, 109a, 109b) includes an electromagnetic actuator. The electromagnetic actuator is comprised of at least an axially-movable plunger (consisting of a movable rod 210 fixed to the tip end 202a of the valve stem of an engine valve portion 202, a movable discshaped portion 211 made of magnetic substance, fixed to the middle portion of rod 210, and located between two opposing attracting faces 208b and 209b of magnets 208 and 209), an upper coiled valve spring 215, a lower coiled valve spring 204, upper and lower electromagnetic coils 209a and 208a, and upper and lower magnets 209 and 208. Movable plunger rod 210 is slidably fitted into the axial central bores of magnets 208 and 209 and coaxially arranged with the valve stem of engine valve portion 202. Engine valve portion 202 is slidably supported on a valve guide (not numbered) in the cylinder head 201. A valve retainer 203 is fixedly connected to the valve stem. Lower valve spring 204 is disposed between the valve retainer and the bottom flattened face of the recessed portion of cylinder head 201, to permanently bias the movable plunger in a direction closing the port 201a of the cylinder head. Reference signs 205, 206, and 207 denote three-split housings in which magnets 208 and 209 are accommodated. Housings 205, 206, and 207 are fixedly mounted on the cylinder head. Upper electromagnetic coil 209a is disposed in the annular recessed portion formed in upper magnet 209, while lower electromagnetic coil 208a is disposed in the annular recessed portion formed in lower magnet 208. When electromagnetic coil 208a is excited or energized by means of the driver associated therewith, movable disc-shaped plunger portion 211 is attracted downwards (that is, toward upper attracting face 208b of lower magnet 208) against the bias of lower valve spring 204 by way of an attraction force. Conversely, when electromagnetic coil 209a is excited or energized by means of the driver associated therewith, movable disc-shaped plunger portion 211 is attracted upwards (that is, toward lower attracting face 209b of upper magnet 209) against the bias of upper valve spring 215 by way of an attraction force. An upper valve-spring seat 214 is fixed to the upper end of movable plunger rod 210. Upper valve spring 215 is disposed between upper valve-spring seat 214 and the upper wall portion of a spring cover 216, to permanently bias the movable plunger in a direction opening of the port 201a. With the previously-noted arrangement, it is possible to arbitrarily control the opening and closing of each engine valve (108a, 108b, 109a, 109b) by controlling the activation and deactivation of the electromagnetic coils. A displacement sensor 217 is located at the tip end of movable plunger rod 210 for monitoring or detecting an axial displacement (or an actual valve lift or an actual valve lifting height) of movable rod 210. Usually, displacement sensor 217 in its simplest form is generally one of a potentiometer (a variable resistor).

Figure 4:
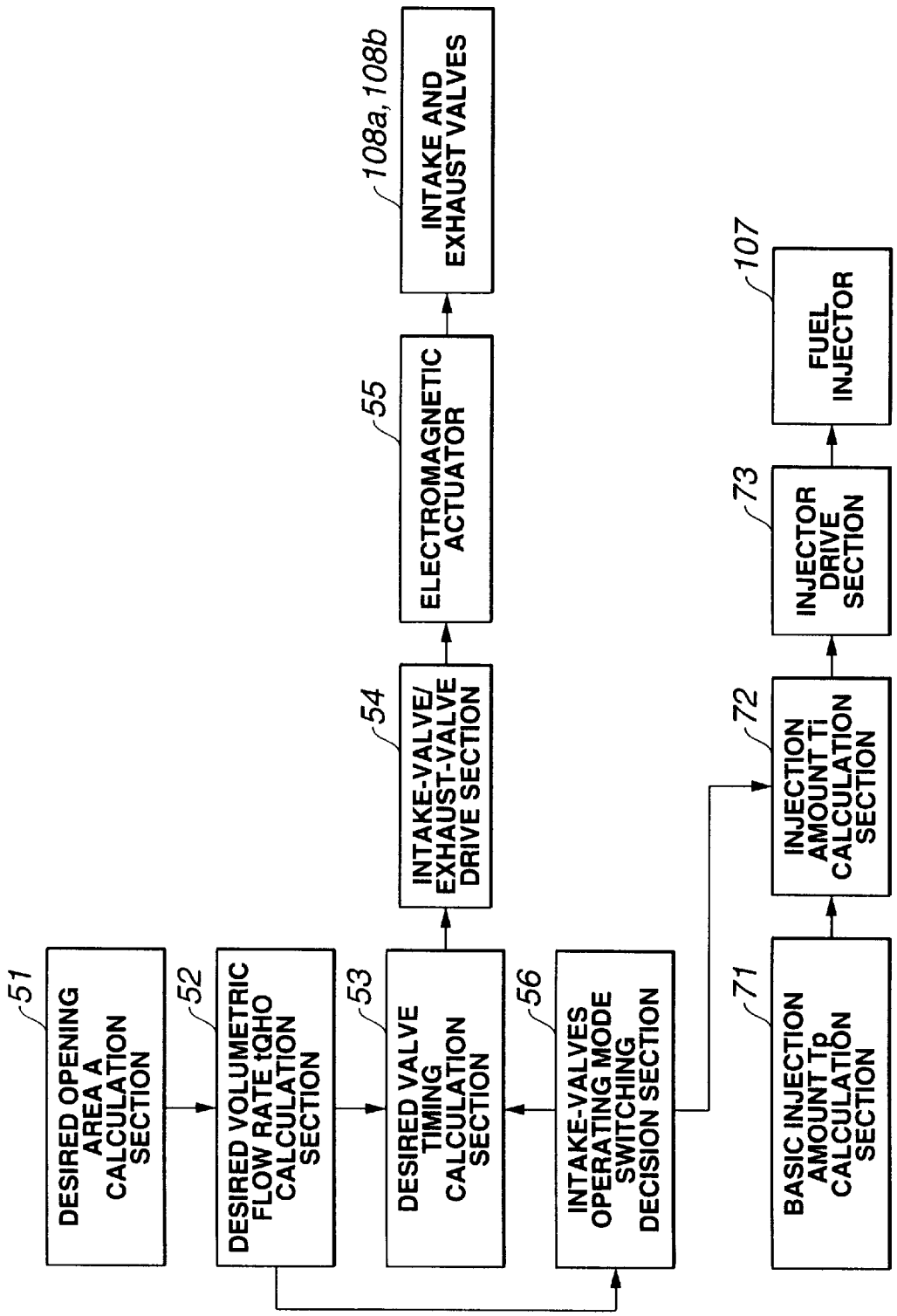
FIG. 4 is a detailed block diagram of one embodiment of the control apparatus of the invention.
Figure 5:
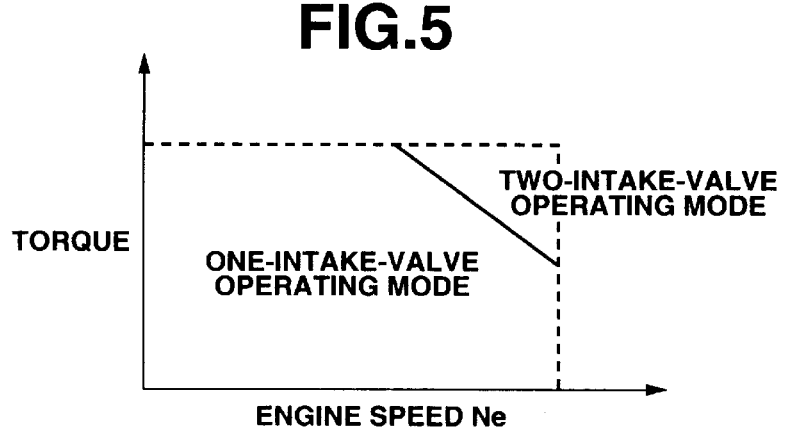
FIG. 5 is a predetermined characteristic line map showing the intake valve operating mode switching characteristic between a one-intake-valve operating mode and a two-intake-valve operating mode in the control apparatus of the embodiment.
Figure 6:
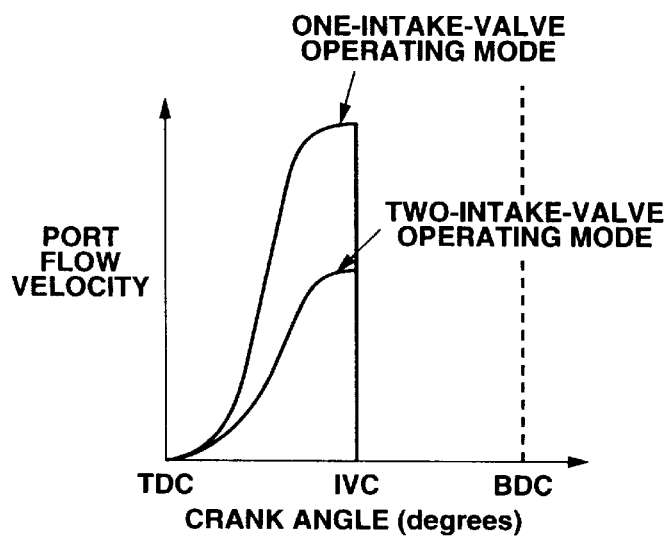
FIG. 6 shows crank-angle versus port-flow velocity characteristic curves at each of the intake valve operating modes.
Figure 7:
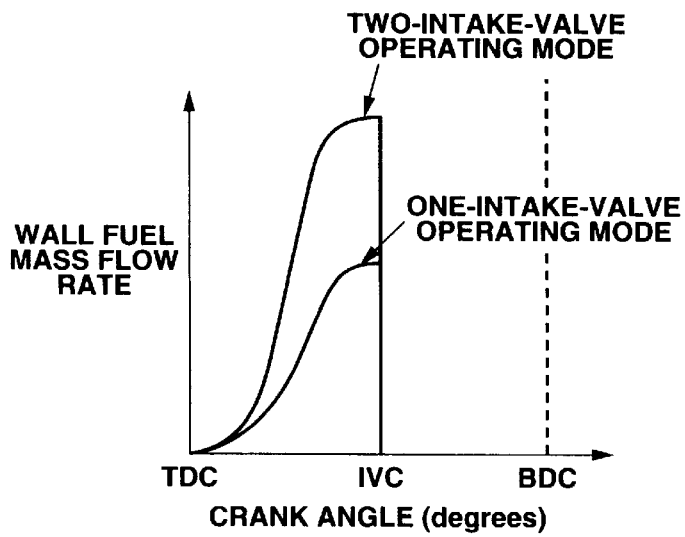
FIG. 7 shows crank-angle versus wall-fuel-mass-flow-rate characteristic curves at each of the intake valve operating modes.

Details of the engine control executed by ECU 113 incorporated in the control apparatus of the embodiment are described hereunder in reference to the block diagram shown in FIG. 4. A desired opening area calculation section 51 arithmetically calculates a desired opening area A of the induction system, substantially corresponding to a desired engine output torque value, on the basis of the accelerator opening APO sensed by accelerator sensor 117. A desired volumetric flow rate calculation section 52 arithmetically calculates a desired volumetric flow rate tQHO, corresponding to a desired intake-air quantity, on the basis of desired induction-system, opening area A, engine speed Ne, and a displacement of the engine. A desired valve timing calculation section 53 computes or determines a desired intake valve closure timing (IVC), a desired intake valve open timing (IVO), a desired exhaust valve closure timing (EVC), and a desired exhaust valve open timing (EVO) of intake and exhaust valves (108a, 108b, 109a, 109b), on the basis of desired volumetric flow rate tQHO and a desired internal exhaust-gas-recirculation (EGR) rate. By way of electronic variable valve timing control based on the valve timings (IVC, IVO, EVC, EVO) determined by desired valve timing calculation section 53, the intake-air quantity is controlled or brought closer to the desired intake-air quantity (desired volumetric flow rate tQHO). The electronic variable valve timing control enables a high-response intake-air quantity control, and contributes to a great gas flow (increased turbulent air flow) within the engine cylinder with the first intake valve 108a kept in its closed state in case of a relatively small desired intake-air quantity. An intake-valve/exhaust-valve drive section 54 outputs drive signals (controlled current signals for electromagnetic coils 208a and 209a) to the respective electromagnetic actuators of intake and exhaust valves (108a, 108b, 109a, 109b) in accordance with the desired valve timings (IVC, IVO, EVC, EVO). The system of the embodiment is designed so that a quantity of air drawn into each engine cylinder can be regulated or controlled to a value corresponding to the desired volumetric flow rate by controlling the intake valve closure timing (IVC) of each of intake valves 108a and 108b, responsively to the desired volumetric flow rate tQHO. An intake-valves operating mode switching decision section (simply, a valve operating mode selector) 56 selects either one of a one-intake-valve operating mode and a two-intake-valve operating mode, on the basis of engine operating conditions, that is, engine load(desired volumetric flow rate tQHO) and engine speed Ne. During the one intake-valve operating mode, a first one (108a) of intake valves 108a and 108b is driven and thus air is drawn through only the first intake port 103a associated with first intake valve 108a into the cylinder. During the two-intake-valve operating mode, the first and second intake valves 108a and 108b are both driven and thus air is drawn through two intake ports 103a and 103b into the cylinder. Concretely, as seen from the predetermined or preprogrammed characteristic line map of FIG. 5, in a predetermined high-load, high-speed operating range, the two-intake-valve operating mode is selected, and thus intake valves 108a and 108b can be both opened in a manner so as to allow the air-fuel mixture to enter the engine cylinder via two intake ports 103a and 103b. In another engine operating ranges except for high-load, high-speed operations, that is, at least in a predetermined low-load, low-speed operating range, preferably in predetermined low- and mid-load, low- and mid-speed operating ranges, the one-intake-valve operating mode is selected, so that the second intake valve 108b is kept fully closed, whereas only the first intake valve 108a is driven or opened depending on the engine operating conditions, to allow the air-fuel mixture to enter the engine cylinder via only the intake port 103a associated with first intake valve 108a. In the shown embodiment, to achieve the one-intake-valve operating mode, first intake valve 108a is kept in the operative state and second intake valve 108b is kept fully closed. Alternatively, a intake-air flow control valve may be located upstream of the second intake valve and provided in the second intake port, so as to block air flow directed toward the second intake port at the one-intake-valve operating mode. Such a structure that the second intake valve 108b itself is kept in the fully-closed state in order to achieve the one-intake-valve operating mode, is simple as compared to the use of an additional flow control valve. As discussed above, in the low- and mid-load, low- and mid-speed operating ranges, when the one-intake-valve operating mode is selected and thus air is inducted or drawn through a comparatively narrow opening area defined by only one intake port 103a (first intake valve 108a) into the cylinder. As compared to during the two-intake-valve operating mode, during the one-intake-valve operating mode there is a remarkably increased tendency for an air flow velocity (a port flow velocity) of air mass flow in the first intake port 103a (associated with first intake valve 108a) to rise (see FIG. 6). This ensures a great gas flow (increased turbulent air flow or increased swirling action), thus insuring good mixing of fuel and air and stable combustion, in the low- and mid-load, low- and mid-speed operating ranges. In addition to the above, in the system of the embodiment, fuel injection valve 107 is provided in a side of first intake port 103a associated with first intake valve 108a which is driven or opened during the one-intake-valve operating mode as well as during the two-intake-valve operating mode, so that fuel is injected or sprayed through the injector towards only the fillet of first intake valve 108a. Note that fuel spray is not directed to the fillet of second intake valve 108b (see FIG. 2). Therefore, even when the one-intake-valve operating mode is selected in the low- and mid-load, low- and mid-speed operating ranges, and thus only the first intake valve 108a is driven and the second intake valve 108b, located in intake port 103b, is kept in its fully closed state, a quantity of wall fuel mass flow adhered onto the inner wall surface of second intake port tends to be reduced. Input information indicative of decision results of valve operating mode selector 56 is sent out to the previously-noted desired valve timing calculation section. Desired valve timing calculation section 53 determines the desired intake valve closure timing IVC of intake valve 108a in such a manner as to achieve desired volumetric flow rate tQHO by only a quantity of air drawn through only the first intake valve 108a (first intake port 103a) into the cylinder in the predetermined low- and mid-load, low- and mid-speed operating ranges (see the pentagonoid area of FIG. 5). Conversely, in the predetermined high-load, high-speed operating range (see the triangular area of FIG. 5) in which a required intake-air quantity (a required engine torque) is large and thus the two-intake-valve operating mode is selected, desired valve timing calculation section 53 determines the desired intake valve closure timing IVC of first intake valve 108a and the desired intake valve closure timing IVC of second intake valve 108b in such a manner as to produce or attain desired volumetric flow rate tQHO by a quantity of air drawn through both the first and second intake valves (first and second intake ports 103a and 103b) into the cylinder. In more detail, during valve timing control, the desired intake valve open timing IVO of each intake valve (108a, 108b) is fixed to a predetermined valve timing substantially corresponding to top dead center (TDC). On the other hand, in order to produce desired volumetric flow rate tQHO, the desired intake valve closure timing IVC of each intake valve (108a, 108b) is computed or retrieved from a predetermined desired volumetric flow rate tQHO versus intake valve closure timing IVC characteristic map showing how an intake valve closure timing IVC varies relative to a desired volumetric flow rate tQHO. In the system of the embodiment, the predetermined tQHO versus IVC characteristic map is preprogrammed so that the intake valve closure timing IVC is phase-advanced towards the TDC with a decrease in desired volumetric flow rate tQHO (a decrease in desired intake-air quantity), for example during light-load operation, and so that the intake valve closure timing IVC is phase-retarded towards bottom dead center (BDC) with an increase in the desired volumetric flow rate (an increase in desired intake-air quantity), for example during high-load operation. Basic injection amount calculation section 71 arithmetically calculates or computes a basic fuel injection amount Tp (corresponding to a pulsewidth time of a basic pulsewidth modulated duty-cycle signal) on the basis of the volumetric flow rate QHO, corresponding to an intake-air quantity sensed by the airflow meter, and engine speed Ne sensed by crank angle sensor 114. In lieu thereof, the basic injection amount Tp may be calculated based on desired volumetric flow rate tQHO. Injection amount calculation section 72 performs a wall fuel mass flow rate compensation for the basic fuel injection amount Tp, taking into account changes in wall fuel mass flow rate during transient engine operating conditions, in particular during load change transients, so as to properly compensate for the basic fuel injection amount and to calculate a final fuel injection amount Ti. Injection amount calculation section 72 is designed to execute the wall fuel mass flow rate compensation by way of interrupt fuel injection, as needed. As discussed above, there is the difference in air flow velocity within the first intake port associated with first intake valve 108a between the one-intake-valve operating mode and the two-intake-valve operating mode. Owing to the port flow velocity difference of first intake port 103a between the two different intake valve operating modes, the wall fuel mass flow rate in first intake port 103a tends to remarkably decrease at the one-intake-valve operating mode, when compared to the two-intake-valve operating mode (see the characteristic curves shown in FIG. 7). For the reasons set forth above, injection amount calculation section 72 is also designed to switch between a wall fuel mass flow rate compensation used for the one-intake-valve operating mode and a wall fuel mass flow rate compensation used for the two-intake-valve operating mode, depending on whether valve operating mode selector 56 selects the one-intake-valve operating mode or the two-intake-valve operating mode. Irrespective of the difference in wall fuel mass flow in first intake port 103a between the two different intake valve operating modes, the system of the embodiment can suitably compensate for the fuel injection amount, thus ensuring a high air/fuel ratio control accuracy even during a load change transient.

Figure 8:
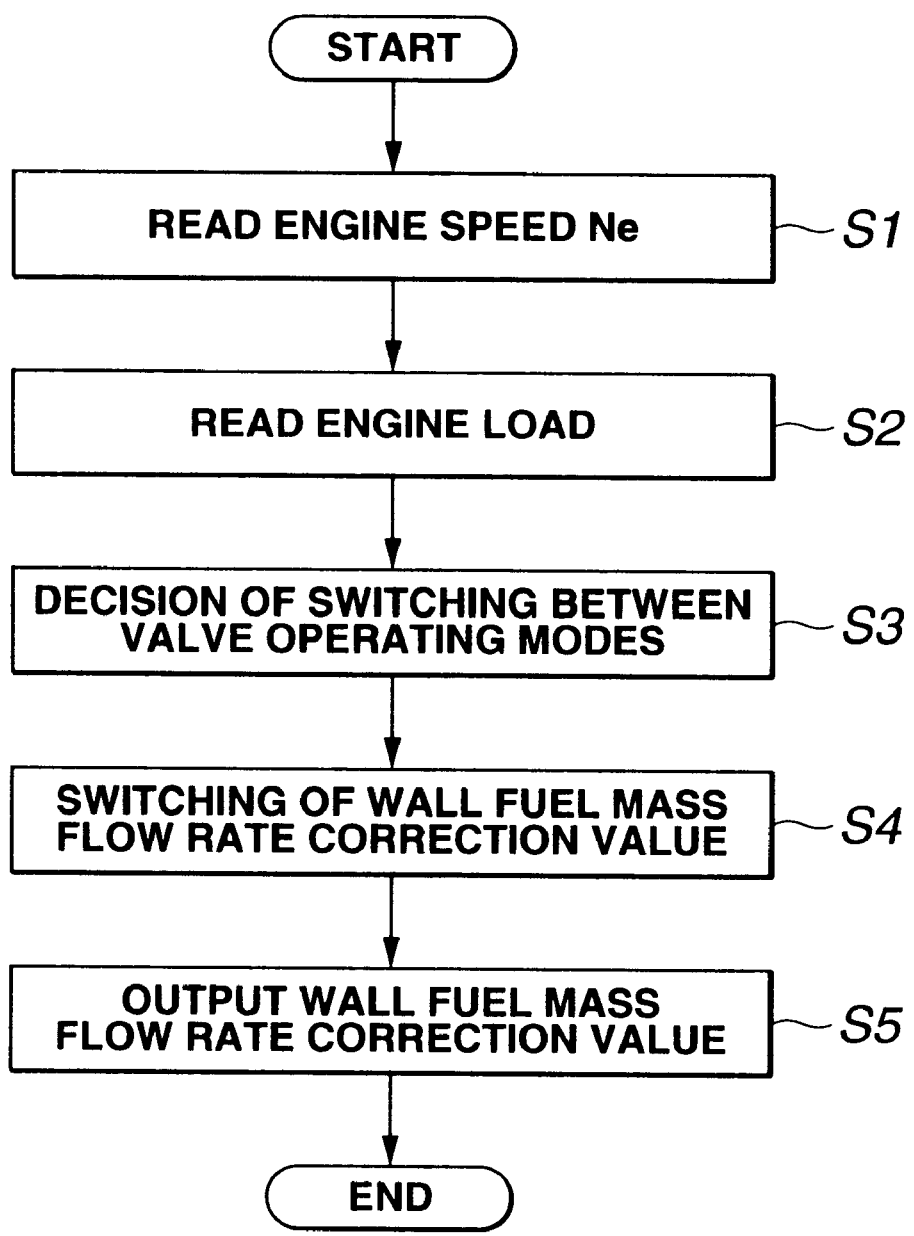
FIG. 8 is a flow chart showing a control routine for the intake valve operating mode switching operation and wall fuel mass flow rate compensation, in the control apparatus of the embodiment.

As described in detail in reference to the flow chart shown in FIG. 8, the control apparatus of the embodiment executes the cooperative control of intake-air quantity control and fuel injection control, without lowering the air/fuel ratio control accuracy during load change transients. At steps S1 and S2, engine operating conditions, that is, engine speed Ne and engine load (desired volumetric flow rate tQHO) are read. At step S3, a better one of the one-intake-valve operating mode and the two-intake-valve operating mode is selected or determined depending on the latest up-to-date input informational data (Ne, tQHO) concerning engine operating conditions. At step S4, a wall fuel mass flow rate compensating mode is switched from one of first and second wall fuel mass flow rate compensating modes to the other, responsively to the intake valve operating mode determined through step S3. As will be fully described later in reference to the block diagrams shown in FIGS. 9 and 10, the first wall fuel mass flow rate compensating mode is preprogrammed to be suitable for the one-intake-valve operating mode, whereas the second wall fuel mass flow rate compensating mode is preprogrammed to be suitable for the two-intake-valve operating mode. Thereafter, through step S5, a wall fuel mass flow rate correction value is output to properly compensate for a quantity of fuel injected or sprayed.

Figure 9:
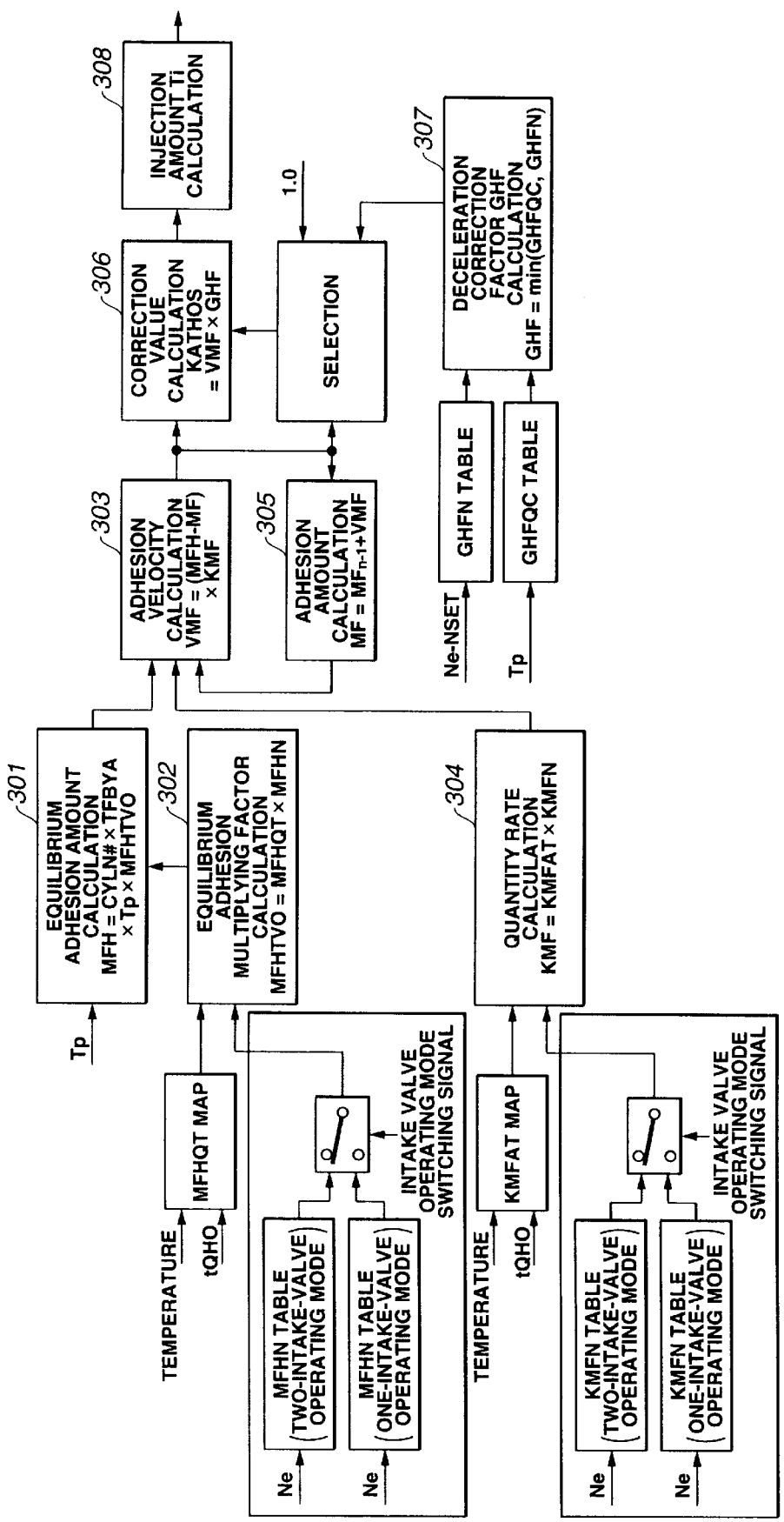
FIG. 9 is a detailed block diagram showing the wall fuel mass flow rate related fuel injection amount compensation (for low frequency components) executed by the control apparatus of the embodiment.

Referring now to FIG. 9, there is shown the block diagram of a series of wall fuel mass flow rate related fuel injection amount compensation procedures (in particular for low frequency Components). An equilibrium adhesion amount calculation section 301 calculates an equilibrium adhesion amount MFH of wall fuel mass flow rate on the basis of all of the number CYLN# of engine cylinders, a desired equivalent ratio TFBYA, basic fuel injection amount Tp, and an equilibrium adhesion multiplying factor MFHTVO, from the following expression.

$$MFH = CYLN\# \times TFBYA \times Tp \times MFHTVO$$

Equilibrium adhesion multiplying factor MFHTVO is arithmetically calculated by means of an equilibrium adhesion multiplying factor calculation section 302. Equilibrium adhesion multiplying factor calculation section 302 receives two input information data, namely an equilibrium-adhesion-multiplying-factor basic value MFHQT and an engine-speed correction factor MFHN. Equilibrium-adhesion-multiplying-factor basic value MFHQT is based on both air temperature Ta sensed by the intake-air temperature sensor and desired volumetric flow rate tQHO, and is map-retrieved from a predetermined characteristic map showing how an equilibrium-adhesion-multiplying-factor basic value MFHQT varies relative to an air temperature value of intake air entering the induction system and a desired volumetric flow rate. On the other hand, engine-speed correction factor MFHN is based on the latest up-to-date engine speed data Ne and is selected and retrieved from two different MFHN lookup tables, one being a first predetermined Ne versus MFHN lookup table which is preprogrammed to be suitable for the one-intake-valve operating mode and the other being a second predetermined Ne versus MFHN lookup table which is preprogrammed to be suitable for the two-intake-valve operating mode. That is, when the system is operating at the one-intake-valve operating mode, engine-speed correction factor MFHN is retrieved on the basis of the more recent engine speed data Ne from the first predetermined Ne-MFHN lookup table. Conversely, when the system is operating at the two-intake-valve operating mode, engine-speed correction factor MFHN is retrieved on the basis of the more recent engine speed data Ne from the second predetermined Ne-MFHN lookup table. Equilibrium adhesion multiplying factor calculation section 302 calculates equilibrium adhesion multiplying factor MFHTVO based on both equilibrium-adhesion-multiplying-factor basic value MFHQT and engine-speed correction factor MFHN selected depending on whether the system is operating at the one-intake-valve operating mode or at the two-intake-valve operating mode, from the following expression.

$$MFHTVO = MFHQT \times MFHN$$

Equilibrium adhesion amount MFH calculated by equilibrium adhesion amount calculation section 301 is output into an adhesion velocity calculation section 303. Adhesion velocity calculation section 303 further receives two different input information data, namely the previous value MF $(=MFH_{(n-1)})$ of equilibrium adhesion amount, and a quantity rate (or an engine-operating-conditions dependent correction factor) KMF (which will be fully described later). Adhesion velocity calculation section 303 calculates an adhesion velocity VMF on the basis of the three input information data, MFH, KMF, and MF, from the following expression.

$$VMF = (MFH - MF) \times KMF$$

The adhesion velocity means a time rate of change in the wall fuel mass flow rate (a quantity of wall fuel mass flow adhered onto the inner wall surface of the intake port). The previously-noted quantity rate KMF is calculated by means of a quantity rate calculation section 304. Quantity rate calculation section 304 receives two input information data, namely a quantity rate basic value (or a basic correction factor) KMFAT and an engine-speed correction factor KMFN. Quantity rate basic value KMFAT is based on both air temperature Ta and desired volumetric flow rate tQHO, and is map-retrieved from a predetermined characteristic map showing how a quantity rate basic value KMFAT varies relative to an air temperature of intake air entering the induction system and a desired volumetric flow rate. On the other hand, engine-speed correction factor KMFN is based on the latest up-to-date engine speed data Ne and is selected and retrieved from two different KMFN lookup tables, one being a first predetermined Ne versus KMFN lookup table which is preprogrammed to be suitable for the one-intake-valve operating mode and the other being a second predetermined Ne versus KMFN lookup table which is preprogrammed to be suitable for the two-intake-valve operating mode. When the system is operating at the one-intake-valve operating mode, engine-speed correction factor KMFN retrieved from the first predetermined Ne-KMFN lookup table is selected as input information used within quantity rate calculation section 304. Conversely, when the system is operating at the two-intake-valve operating mode, engine-speed correction factor KMFN retrieved from the second predetermined Ne-KMFN lookup table is selected as input information used within quantity rate calculation section 304. Then, quantity rate calculation section 304 calculates the quantity rate KMF based on both quantity rate basic value KMFAT and engine-speed correction factor KMFN selected depending on whether the system is operating at the one-intake-valve operating mode or at the two-intake-valve operating mode, from the following expression.

$$KMF = KMFAT \times KMFN$$

Adhesion velocity VMF calculated through adhesion velocity calculation section 303 is input into an adhesion amount calculation section 305. Adhesion amount calculation section 305 calculates or estimates a new adhesion amount MF by adding adhesion velocity VMF calculated within the block 303 to the previous value $MF_{n-1}$ of the adhesion amount, from the expression $(MF=MF_{n-1}+VMF)$. Instead of addition of the adhesion velocity VMF to the previous adhesion amount $MF_{n-1}$, a new adhesion amount MF maybe calculated by adding the product K·VMF of the adhesion velocity VMF and a predetermined coefficient K to the previous adhesion amount $MF_{n-1}$. A correction value calculation section 306 receives a deceleration correction factor GHF as well as the calculated adhesion velocity VMF, and then calculates a wall fuel mass flow rate correction value KATHOS based on these input information data (VMF, GHF), from the expression (KATHOS=VMF×GHF). Thereafter, an injection amount calculation section 308 compensates for basic fuel injection amount Tp responsively to the wall fuel mass flow rate correction value KATHOS generated from correction value calculation section 306, so as to calculate or determine a final fuel injection amount Ti. The previously-noted deceleration correction factor GHF is calculated by means of a deceleration correction factor calculation section 307. Deceleration correction factor calculation section 307 receives two input information data, namely a first deceleration correction factor GHFN and a second deceleration correction factor GHFQC. First deceleration correction factor GHFN is retrieved on the basis of engine speed data Ne (exactly, a rate of change in engine speed) from a predetermined deceleration correction factor GHFN lookup table. Second deceleration correction factor GHFQC is retrieved on the basis of basic fuel injection amount Tp (exactly, a rate of change in basic fuel injection amount) from a predetermined deceleration correction factor GHFQC lookup table. Deceleration correction factor calculation section 307 selects a smaller one of the two input information data GHFN and GHFQC, byway of a so-called select-low process min(GHFQC, GHFN). A selection block (not numbered) is interleaved between correction value calculation section 306 and deceleration correction factor calculation section 307, for properly selecting a better one of a preset value of "1.0" and the deceleration correction factor GHF determined by the block 307, responsively to the adhesion velocity VMF. As set forth above, when only the first intake valve 108a is driven or opened and thus the system is operating at the one-intake-valve operating mode to draw air through only the first intake port 103a into the cylinder, the air velocity of air passing through the first intake port tends to rise, thereby resulting in the reduced equilibrium adhesion amount of wall fuel mass flow on the inner wall surface of intake port 103a. According to the control apparatus of the embodiment shown in FIG. 9, engine-speed correction factor MFHN for equilibrium adhesion multiplying factor MFHTVO and engine-speed correction factor KMFN for quantity rate KMF (consequently, adhesion velocity VMF) can be properly determined or switched, depending on whether the system is operating at the one-intake-valve operating mode or at the two-intake-valve operating mode. By virtue of such proper switching between the first and second Ne versus MFHN lookup tables, respectively preprogrammed to be suitable for the one-intake-valve operating mode and the two-intake-valve operating mode, and by virtue of such proper switching between the first and second Ne versus KMFN lookup tables, respectively preprogrammed to be suitable for the one-intake-valve operating mode and the two-intake-valve operating mode, it is possible to properly accurately compensate for the fuel injection amount, taking into account changes in the wall fuel mass flow rate, occurring owing to the difference in air flow velocity (that is, the difference in equilibrium adhesion amount) within first intake port 103a between the one-intake-valve operating mode and the two-intake-valve operating mode. In the wall fuel mass flow rate compensation previously discussed in reference to the block diagram shown in FIG. 9, low frequency components for fuel injection amount can be properly compensated for. Regarding compensation for high frequency components based on changes in the wall fuel mass flow rate, if the system is operating at the one-intake-valve operating mode and only the first intake valve 108a is opened, by properly changing or reducing a response gain for wall fuel mass flow rate compensation, it is possible to properly compensate for the fuel injection amount, taking into account changes in the wall fuel mass flow rate, occurring owing to the difference in air flow velocity (that is, the difference in equilibrium adhesion amount) within first intake port 103a between the one-intake-valve operating mode and the two-intake-valve operating mode.

Figure 10:
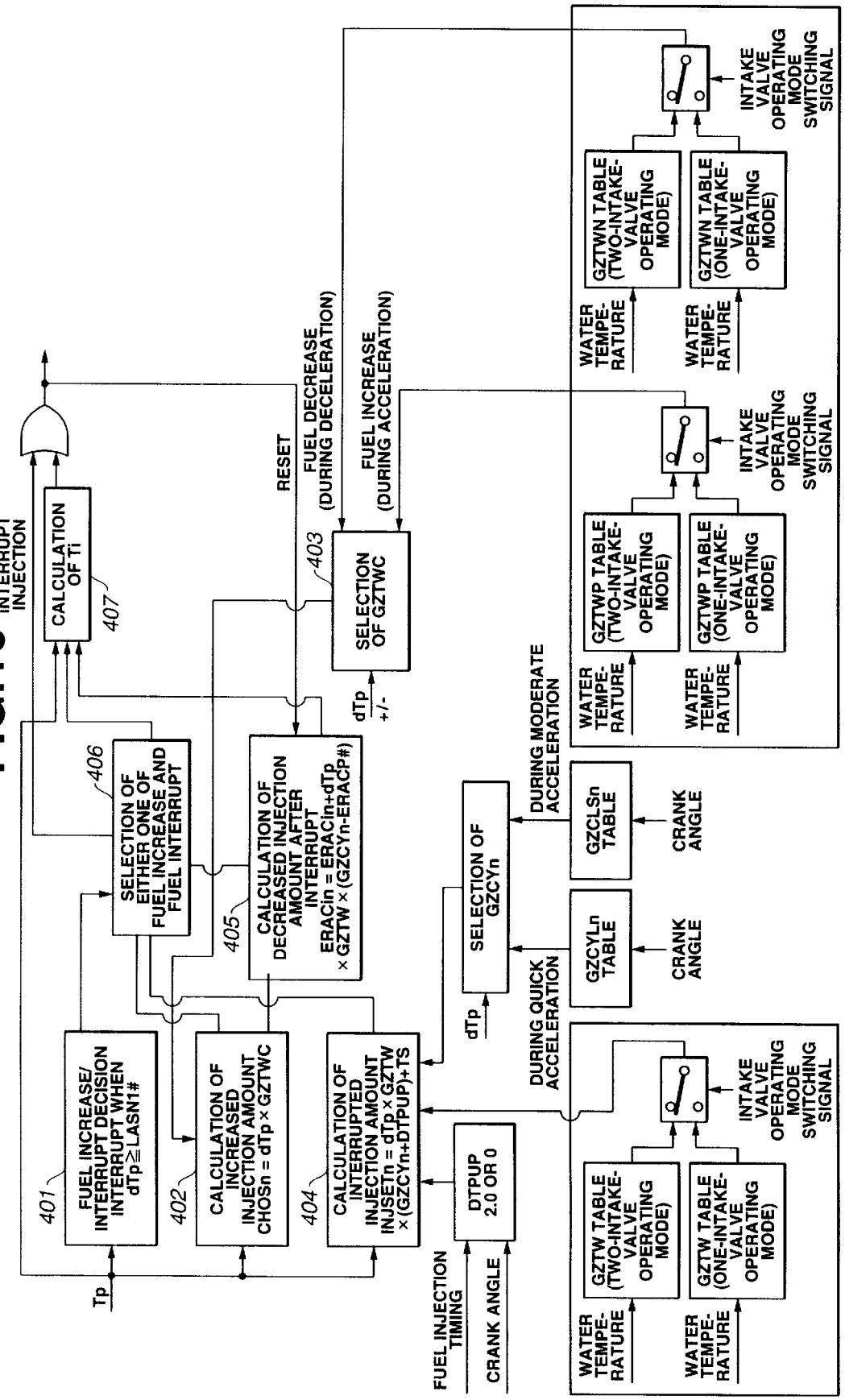
FIG. 10 is a detailed block diagram showing the wall fuel mass flow rate related fuel injection amount compensation (for high frequency components) executed by the control apparatus of the embodiment.

Referring now to FIG. 10, there is shown the block diagram of a series of wall fuel mass flow rate related fuel injection amount compensation procedures (in particular for high frequency components). A fuel increase/interrupt decision section 401 determines based on a time-rate-of-change dTp in the basic fuel injection amount as to whether fuel increase or fuel interrupt is required. Within fuel increase/interrupt decision section 401, the time rate dTp of change in basic fuel injection amount Tp is compared to a predetermined threshold value LASN1#. When the time-rate-of-change dTp of the basic fuel injection amount is above predetermined threshold value LASN1#, that is, in case of dTp≧LASN1#, the system determines that the fuel interrupt is required. An increased fuel injection amount calculation section 402 calculates a corrected fuel injection amount CHOSn (an increased fuel injection amount) used to compensate for fuel injection at a usual injection timing, on the basis of both the time-rate-of-change dTp of the basic fuel injection amount and a water-temperature correction factor GZTWC, from the expression (CHOSn=dTp×GZTWC). The output of a selection section 403 is used as water-temperature correction factor GZTWC for increased fuel injection amount calculation section 402. Actually, selection section 403 selects either one of a fuel-increase water-temperature correction factor GZTWP suitable for fuel increase (i.e., for vehicle acceleration) and a fuel-decrease water-temperature correction factor GZTWN suitable for fuel decrease (i.e., for vehicle deceleration), responsively to the time-rate-of-change dTp of the basic fuel injection amount. Fuel-increase water-temperature correction factor GZTWP is based on the latest up-to-date water temperature data Tw (the more recent engine temperature data), and is selected and retrieved from two different GZTWP lookup tables, one being a first predetermined Tw versus GZTWP lookup table which is preprogrammed to be suitable for the one-intake-valve operating mode and the other being a second predetermined Tw versus GZTWP lookup table which is preprogrammed to be suitable for the two-intake-valve operating mode. In a similar manner, fuel-decrease water-temperature correction factor GZTWN is based on the latest up-to-date water temperature data Tw (the more recent engine temperature data), and is selected and retrieved from two different GZTWN lookup tables, one being a first predetermined Tw versus GZTWN lookup table which is preprogrammed to be suitable for the one-intake-valve operating mode and the other being a second predetermined Tw versus GZTWN lookup table which is preprogrammed to be suitable for the two-intake-valve operating mode. An interrupted injection amount calculation section 404 receives four different input information data, namely basic fuel injection amount Tp, a first coefficient DTPUP determined based on both the fuel injection timing and crank angle and selected from "2.0" and "0", a water-temperature correction factor GZTW, and a second coefficient GZCYn based on the crank angle and determined depending on whether the vehicle is accelerating moderately or quickly. Interrupted injection amount calculation section 404 calculates an interrupted fuel injection amount INJSETn on the basis of the time-rate-of-change dTp of the basic fuel injection amount, water-temperature correction factor GZTW, first coefficient DTPUP based on both the fuel injection timing and crank angle, and second coefficient GZCYn based on the crank angle and the degree of vehicle acceleration, from the following expression.

$$INJSETn = dTp \times GZTW \times (GZCYn + DTPUP) + TS$$

where TS denotes a predetermined interrupted amount. The water-temperature correction factor GZTW is based on the latest up-to-date water temperature data Tw and is selected and retrieved from two different GZTW lookup tables, one being a first predetermined Tw versus GZTW lookup table which is preprogrammed to be suitable for the one-intake-valve operating mode and the other being a second predetermined Tw versus GZTW lookup table which is preprogrammed to be suitable for the two-intake-valve operating mode. During the quick acceleration, the above-mentioned second coefficient GZCYn based on the crank angle and the degree of acceleration, is retrieved based on the crank angle from a first predetermined crank-angle versus correction factor GZCYLn characteristic lookup table. Conversely, during the moderate acceleration, the above-mentioned second coefficient GZCYn is retrieved based on the crank angle from a second predetermined crank-angle versus correction factor GZCLSn characteristic lookup table. A better one of the crank angle plus quick-acceleration related coefficient GZCYLn and the crank angle plus moderate-acceleration related coefficient GZCLSn is selected depending on the time-rate-of-change dTp of the basic fuel injection amount. An after-interrupt decreased injection amount calculation section 405 calculates a correction value used to decreasingly compensate for a fuel injection amount of fuel injection which will be made at the usual injection timing after the fuel interrupting operation. Concretely, after-interrupt decreased injection amount calculation section 405 calculates a decreased fuel injection amount ERACin needed after fuel interruption, on the basis of the previous value ERACin of after-interrupt decreased injection amount, the time-rate-of-change dTp of the basic fuel injection amount, water-temperature correction factor GZTW, second coefficient GZCYn, and a predetermined constant ERACP#, from the following expression.

$$ERACin = ERACin + dTp \times GZTW \times (GZCYn - ERACP\#)$$

A selection section 406 receives input informational signals indicative of the comparison result from fuel increase/interrupt decision section 401, corrected fuel injection amount CHOSn from increased fuel injection amount calculation section 402, interrupted fuel injection amount INJSETn from interrupted injection amount calculation section 404, after-interrupt decreased injection amount ERACin from after-interrupt decreased injection amount calculation section 405. Selection section 406 selects either one of interrupt injection and fuel enrichment (fuel-increasing compensation for the usual fuel injection amount), responsively to the previously-noted input informational signals. In response to the selected fuel injection correcting mode determined by selection section 406, within a final fuel injection amount Ti calculation section 407, a fuel increasing correction or an after-interrupt fuel decreasing correction is made to basic fuel injection amount Tp, so as to calculate or compute final fuel injection amount Ti. Then, a logical circuit consisting of an OR gate logic circuit accepts the output signal from selection section 406 and the output signal from final fuel injection amount Ti calculation section 407, and logically makes sense of them. A quantity of fuel injected from injector 107 is properly adjusted or controlled in response to the output from the OR gate logic circuit. Upon fuel injection based on the output of the OR gate logic circuit, the decreased fuel injection amount ERACin indicative data of the block 405 is reset. With the previously-noted arrangement of the embodiment shown in FIG. 10, during the one-intake-valve operating mode during which only the first intake valve 108a is in its operative state and the second intake valve is kept in its fully closed state, a proper response gain for compensation for the fuel injection amount can be suitably selected or switched responsively to changes in the equilibrium adhesion amount of wall fuel mass flow rate on the inner wall of intake port 103a, occurring due to a rise in air flow velocity of intake air flowing within intake port 103a. This insures an accurate compensation for the fuel injection amount, that is, a high air/fuel ratio control accuracy, even during a load change transient.

As will be appreciated from the above, according to an engine control apparatus of the invention, depending on engine operating conditions such as engine speed and engine load, a valve operating mode selector selects a better one of a one-intake-valve operating mode during which a first one of a pair of intake valves provided for each engine cylinder is driven and the second intake valve is kept in a fully closed state to allow air to enter the cylinder via only the first intake port associated with the first intake valve, and a two-intake-valve operating mode during which the first and second intake valves are both driven to allow air to enter the cylinder via both the first and second intake ports respectively associated with the first and second intake valves. Additionally, a fuel injector is provided in the first intake port through which air can be drawn into the cylinder in all engine operating ranges, that is, at the one-intake-valve operating mode as well as the two-intake-valve operating mode. A fuel injection amount compensation based on changes in wall fuel mass flow on the inner wall surface of the first intake port during a load change transient, can be properly switched depending on engine operating conditions, exactly depending on whether the valve operating mode is the one-intake-valve operating mode or the two-intake-valve operating mode. Fuel spray can be supplied into the cylinder through only the first intake port in which the injector is provided and through which air enters the cylinder all of the engine operating ranges. This effectively reduces the flow rate of fuel adhered to the inner wall surface of each intake port. The previously-discussed proper switching between the one-intake-valve operating mode and the two-intake-valve operating mode depending on whether the engine is conditioned in a predetermined high-load, high-speed operating range or in predetermined low- and mid-load, low- and mid-speed operating ranges, ensures a high-accuracy air/fuel ratio control during transient operating conditions and insures a great gas flow or great turbulent flow within the cylinder (consequently, good stable combustion) during low- and mid-load, low- and mid-speed operations.

The entire contents of Japanese Patent Application No. P11-346135 (filed Dec. 6, 1999) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A control apparatus for an internal combustion engine comprising:
   a pair of intake ports provided for each cylinder of the engine;
   a mode selector which selects, depending on engine operating conditions, either one of a first operating range in which air is drawn into the cylinder only through a first one of the intake ports and a second operating range in which air is drawn into the cylinder through both the intake ports;
   a fuel injector located in the first intake port through which air flows in all of the first and second operating ranges; and
   a compensator which switches a compensating mode for an injection amount of fuel injected by the injector, based on changes in a quantity of wall fuel mass flow adhered onto an inner wall surface of each of the intake ports during transient operating conditions, from one of a first compensating mode which is preprogrammed to be suitable for the first operating range and a second compensating mode which is preprogrammed to be suitable for the second operating range to the other.

2. The control apparatus as claimed in claim 1, wherein a pair of intake valves are located in the intake ports respectively, and the intake valves comprise a pair of variable valve-operating-system intake valves whose opening and closing are electronically controlled independently of each other, and a first one of the intake valves, located in the first intake port, is opened during intake stroke and the second intake valve, located in the second intake port, is kept in a closed state, to create a state in which air is drawn into the cylinder only through the first intake port in the first operating range.

3. The control apparatus as claimed in claim 2, wherein a quantity of air drawn into the engine is brought closer to a desired intake-air quantity by electronically controlling an intake valve closure timing and an intake valve open timing of each of the intake valves.

4. The control apparatus as claimed in claim 2, which further comprises an electromagnetic valve operating mechanism operatively connected to the intake valve, the electromagnetic valve operating mechanism comprising a non-magnetic housing installed on a cylinder head of the engine, a plunger having a disc-shaped portion and integrally connected to a stem of the intake valve so that the plunger is movable within the housing, a pair of electromagnetic coils respectively facing opposed surfaces of the disc-shaped portion of the plunger, the pair of electromagnetic coils respectively attracting the plunger when the pair of electromagnetic coils are energized, and a pair of return springs biasing the intake valve respectively in a direction opening and closing of the intake valve.

5. The control apparatus as claimed in claim 1, wherein the first operating range corresponds to a predetermined low-load, low-speed range, and the second operating range corresponds to a predetermined high-load, high-speed range.

6. The control apparatus as claimed in claim 1, wherein the first operating range corresponds to predetermined low- and mid-load, low- and mid-speed ranges, and the second operating range corresponds to a predetermined high-load, high-speed range.

7. The control apparatus as claimed in claim 1, which further comprises sensors detecting the engine operating conditions, and wherein the compensator is configured to be connected electrically to at least the sensors and the injector, for automatically compensating for the injection amount depending on the changes in the quantity of wall fuel mass flow as well as the engine operating conditions; the compensator comprising a data processing section programmed to perform the following,
   calculating an adhesion velocity VMF corresponding to a time rate of change in the quantity of wall fuel mass flow adhered onto the inner wall surface $$VMF = (MFH - MF) \times KMF$$

with MFH being an equilibrium adhesion amount of the wall fuel mass flow, MF being an estimated adhesion amount, and KMF being an engine-operating-conditions dependent correction factor; and
   calculating a correction value used to compensate for the injection amount on the basis of the adhesion velocity.

8. The control apparatus as claimed in claim 7, wherein the engine-operating-conditions dependent correction factor is switched between a first predetermined engine-speed versus correction factor characteristic which is preprogrammed to be suitable for the first operating range and a second predetermined engine-speed versus correction factor characteristic which is preprogrammed to be suitable for the second operating range, depending on the engine operating conditions.

9. The control apparatus as claimed in claim 8, wherein the sensors detect at least engine speed, and the data processing section calculates a desired volumetric flow rate of an induction system of the engine on the basis of the engine speed, a basic correction factor based on the desired volumetric flow rate, and an engine-speed correction factor based on the engine speed and switched depending on whether an operating condition of the engine is in the first operating range or in the second operating range, and the engine-operating-conditions dependent correction factor is calculated based on the basic correction factor and the engine-speed correction factor.

10. The control apparatus as claimed in claim 9, wherein the sensors detect an intake-air temperature in the induction system as well as the engine speed, and the basic correction factor varies depending on the intake-air temperature as well as the desired volumetric flow rate.

11. The control apparatus as claimed in claim 7, wherein the equilibrium adhesion amount is switched between a first predetermined engine-speed versus correction factor characteristic which is preprogrammed to be suitable for the first operating range and a second predetermined engine-speed versus correction factor characteristic which is preprogrammed to be suitable for the second operating range, depending on the engine operating conditions.

12. The control apparatus as claimed in claim 11, wherein the sensors detect at least engine speed and a volumetric flow rate of an induction system of the engine, and the data processing section calculates a desired volumetric flow rate based on the engine speed, a basic fuel injection amount based on the volumetric flow rate, a basic correction factor based on the desired volumetric flow rate, an engine-speed correction factor based on the engine speed and switched depending on whether an operating condition of the engine is in the first operating range or in the second operating range, and an equilibrium adhesion multiplying factor based on the basic correction factor and the engine-speed correction factor, and the equilibrium adhesion amount is calculated based on the equilibrium adhesion multiplying factor and the basic fuel injection amount.

13. The control apparatus as claimed in claim 12, wherein the sensors detect an intake-air temperature in the induction system as well as the engine speed, and the basic correction factor varies depending on the intake-air temperature as well as the desired volumetric flow rate.

14. The control apparatus as claimed in claim 1, which further comprises sensors detecting at least engine speed and a volumetric flow rate of an induction system of the engine, and wherein the compensator is configured to be connected electrically to at least the sensors and the injector, for automatically compensating for the injection amount depending on the changes in the quantity of wall fuel mass flow as well as the engine operating conditions; the compensator comprising a data processing section programmed to perform the following, calculating a basic fuel injection amount based on the volumetric flow rate;

calculating a rate of change in the basic fuel injection amount;

determining, responsively to the rate of change in the basic fuel injection amount, whether interrupt injection is required;

selecting a correction value depending on whether an operating condition of the engine is in the first operating range or in the second operating range; and compensating for a fuel injection amount of the interrupt injection by the correction value selected.

15. The control apparatus as claimed in claim 14, wherein the sensors detect engine temperature of the engine, and the correction value varies depending on the engine temperature.

16. The control apparatus as claimed in claim 15, wherein the engine temperature is engine coolant temperature.

17. The control apparatus as claimed in claim 1, which further comprises sensors detecting at least engine speed and a volumetric flow rate of an induction system of the engine, and wherein the compensator is configured to be connected electrically to at least the sensors and the injector, for automatically compensating for the injection amount depending on the changes in the quantity of wall fuel mass flow as well as the engine operating conditions; the compensator comprising a data processing section programmed to perform the following, calculating a basic fuel injection amount based on the volumetric flow rate;

calculating a rate of change in the basic fuel injection amount;

determining, responsively to the rate of change in the basic fuel injection amount, whether fuel-enrichment injection is required;

selecting a correction value depending on whether an operating condition of the engine is in the first operating range or in the second operating range; and compensating for a fuel injection amount of the fuel-enrichment injection by the correction value selected.

18. The control apparatus as claimed in claim 17, wherein the sensors detect engine temperature of the engine, and the correction value varies depending on the engine temperature.

19. The control apparatus as claimed in claim 18, wherein the engine temperature is engine coolant temperature.

20. A control apparatus for an internal combustion engine comprising:

a pair of intake ports provided for each cylinder of the engine;

a pair of intake valves located in the intake ports respectively;

a mode selecting means for selecting, depending on engine operating conditions, either one of a one-intake-valve operating mode in which a first one of the intake valves is opened during intake stroke and the second intake valve is kept in a closed state so that air is drawn into the cylinder only through a first one of the intake ports and a two-intake-valve operating mode in which the intake valves are both opened during the intake stroke so that air is drawn into the cylinder through both the intake ports;

a fuel injector located in the first intake port through which air flows in all of the one-intake-valve operating mode and the two-intake-valve operating mode; and a compensating means for switching a compensating mode for an injection amount of fuel injected by the injector, based on changes in a quantity of wall fuel mass flow adhered onto an inner wall surface of each of the intake ports during transient operating conditions, from one of a first compensating mode which is pre-programmed to be suitable for the one-intake-valve operating mode and a second compensating mode which is preprogrammed to be suitable for the two-intake-valve operating mode to the other.

21. The control apparatus as claimed in claim 20, which further comprises a sensor means for detecting the engine operating conditions, and wherein the compensating means is configured to be connected electrically to at least the sensor means and the injector, for automatically compensating for the injection amount depending on the changes in the quantity of wall fuel mass flow as well as the engine operating conditions; the compensating means comprising a data processing means programmed to perform the following, calculating an adhesion velocity VMF corresponding to a time rate of change in the quantity of wall fuel mass flow adhered onto the inner wall surface $$VMF = (MFH - MF) \times KMF$$

with MFH being an equilibrium adhesion amount of the wall fuel mass flow, MF being an estimated adhesion amount, and KMF being an engine-operating-conditions dependent correction factor; and calculating a correction value used to compensate for the injection amount on the basis of the adhesion velocity.

22. The control apparatus as claimed in claim 21, wherein the equilibrium adhesion amount MFH is calculated from the following expression $$MFH = CYLN\# \times TFBYA \times Tp \times MFHTVO$$

with CYLN# being the number of cylinders of the engine, TFBYA being a desired equivalent ratio, Tp being a pulse-width time of a basic pulsewidth modulated duty-cycle signal corresponding to a basic fuel injection amount based on a volumetric flow rate of an induction system of the engine, and MFHTVO being an equilibrium adhesion multiplying factor based on a desired volumetric flow rate based on the engine operating conditions and a displacement of the engine and determined depending on a selected one of the one-intake-valve operating mode and the two-intake-valve operating mode.

23. The control apparatus as claimed in claim 22, wherein the sensor means detects at least engine speed, and the engine-operating-conditions dependent correction factor KMF is calculated from the following expression $$KMF = KMFAT \times KMFN$$

with KMFAT being a basic correction factor based on the desired volumetric flow rate, and KMFN being an engine-speed correction factor based on the engine speed and switched depending on whether an operating condition of the engine is in the one-intake-valve operating mode or in the two-intake-valve operating mode.

24. The control apparatus as claimed in claim 20, which further comprises a sensor means for detecting at least engine speed and a volumetric flow rate of an induction system of the engine, and wherein the compensating means is configured to be connected electrically to at least the sensor means and the injector, for automatically compensating for the injection amount depending on the changes in the quantity of wall fuel mass flow as well as the engine operating conditions; the compensating means comprising a data processing section programmed to perform the following, calculating a basic fuel injection amount based on the volumetric flow rate;

calculating a rate of change in the basic fuel injection amount;

determining, responsively to the rate of change in the basic fuel injection amount, whether interrupt injection is required;

selecting a correction value depending on whether an operating condition of the engine is in the one-intake-valve operating mode or in the two-intake-valve operating mode; and compensating for a fuel injection amount of the interrupt injection by the correction value selected.

25. The control apparatus as claimed in claim 20, which further comprises a sensor means for detecting at least engine speed and a volumetric flow rate of an induction system of the engine, and wherein the compensating means is configured to be connected electrically to at least the sensor means and the injector, for automatically compensating for the injection amount depending on the changes in the quantity of wall fuel mass flow as well as the engine operating conditions; the compensating means comprising a data processing section programmed to perform the following, calculating a basic fuel injection amount based on the volumetric flow rate;

calculating a rate of change in the basic fuel injection amount;

determining, responsively to the rate of change in the basic fuel injection amount, whether fuel-enrichment injection is required;

selecting a correction value depending on whether an operating condition of the engine is in the one-intake-valve operating mode or in the two-intake-valve operating mode; and compensating for a fuel injection amount of the fuel-enrichment injection by the correction value selected.

26. A method for controlling an internal combustion engine, wherein the engine includes a pair of intake ports provided for each cylinder of the engine, a pair of intake valves located in the intake ports respectively, and a fuel injector located in a first one of the intake ports to allow air to flow through the first intake port over all operating ranges of the engine, the method comprising:

selecting, depending on engine operating conditions, either one of a one-intake-valve operating mode in which a first one of the intake valves is opened during intake stroke and the second intake valve is kept in a closed state so that air is drawn into the cylinder only through the first intake port and a two-intake-valve operating mode in which the intake valves are both opened during the intake stroke so that air is drawn into the cylinder through both the intake ports;

switching a compensating mode for an injection amount of fuel injected by the injector, based on changes in a quantity of wall fuel mass flow adhered onto an inner wall surface of each of the intake ports during transient operating conditions, from one of a first compensating mode which is preprogrammed to be suitable for the one-intake-valve operating mode and a second compensating mode which is preprogrammed to be suitable for the two-intake-valve operating mode to the other.

27. The method as claimed in claim 26, further comprising:

sensing the engine operating conditions;

calculating an adhesion velocity VMF corresponding to a time rate of change in the quantity of wall fuel mass flow adhered onto the inner wall surface $$VMF=(MFH-MF) \times KMF$$

with MFH being an equilibrium adhesion amount of the wall fuel mass flow, MF being an estimated adhesion amount, and KMF being an engine-operating-conditions dependent correction factor;

calculating a correction value used to compensate for the injection amount on the basis of the adhesion velocity.

28. The method as claimed in claim 27, wherein the equilibrium adhesion amount MFH is calculated from the following expression $$MFH=CYLN\# \times TFBYA \times Tp \times MFHTVO$$

with CYLN# being the number of cylinders of the engine, TFBYA being a desired equivalent ratio, Tp being a pulsewidth time of a basic pulsewidth modulated duty-cycle signal corresponding to a basic fuel injection amount based on a volumetric flow rate of an induction system of the engine, and MFHTVO being an equilibrium adhesion multiplying factor based on a desired volumetric flow rate based on the engine operating conditions and a displacement of the engine and determined depending on a selected one of the one-intake-valve operating mode and the two-intake-valve operating mode.

29. The method as claimed in claim 28, wherein the engine operating conditions includes at least engine speed, and the engine-operating-conditions dependent correction factor KMF is calculated from the following expression $$KMF=KMFAT \times KMFN$$

with KMFAT being a basic correction factor based on the desired volumetric flow rate, and KMFN being an engine-speed correction factor based on the engine speed and switched depending on whether an operating condition of the engine is in the one-intake-valve operating mode or in the two-intake-valve operating mode.

30. The method as claimed in claim 26, further comprising:

detecting at least engine speed and a volumetric flow rate of an induction system of the engine;

calculating a basic fuel injection amount based on the volumetric flow rate;

calculating a rate of change in the basic fuel injection amount;

comparing the rate of change in the basic fuel injection amount to a predetermined threshold value;

determining that interrupt injection is required when the rate of change in the basic fuel injection amount is above the predetermined threshold value;

selecting a correction value depending on whether an operating condition of the engine is in the one-intake-valve operating mode or in the two-intake-valve operating mode;

compensating for a fuel injection amount of the interrupt injection by the correction value selected.

31. The method as claimed in claim 26, further comprising:

detecting at least engine speed and a volumetric flow rate of an induction system of the engine;

calculating a basic fuel injection amount based on the volumetric flow rate;

calculating a rate of change in the basic fuel injection amount;

determining, responsively to the rate of change in the basic fuel injection amount, whether fuel-enrichment injection is required;

selecting a correction value depending on whether an operating condition of the engine is in the one-intake-valve operating mode or in the two-intake-valve operating mode;

compensating for a fuel injection amount of the fuel-enrichment injection by the correction value selected.

* * * * *